United States Patent
Agrawal

(10) Patent No.: US 11,930,240 B2
(45) Date of Patent: Mar. 12, 2024

(54) MEDIA CONTENT RECORDING WITH SENSOR DATA

(71) Applicant: Motorola Mobility LLC, Chicago, IL (US)

(72) Inventor: Amit Kumar Agrawal, Bangalore (IN)

(73) Assignee: Motorola Mobility LLC, Chicago, IL (US)

( * ) Notice: Subject to any disclaimer, the term of this patent is extended or adjusted under 35 U.S.C. 154(b) by 45 days.

(21) Appl. No.: 17/095,363

(22) Filed: Nov. 11, 2020

(65) Prior Publication Data

US 2022/0150571 A1 May 12, 2022

(51) Int. Cl.
| | |
|---|---|
| H04N 21/43 | (2011.01) |
| H04N 21/422 | (2011.01) |
| H04N 21/478 | (2011.01) |
| H04N 21/81 | (2011.01) |

(52) U.S. Cl.
CPC ... *H04N 21/4307* (2013.01); *H04N 21/42203* (2013.01); *H04N 21/42222* (2013.01); *H04N 21/4781* (2013.01); *H04N 21/8173* (2013.01)

(58) Field of Classification Search
None
See application file for complete search history.

(56) References Cited

U.S. PATENT DOCUMENTS

| | | | |
|---|---|---|---|
| 8,191,152 | B1 | 5/2012 | Barker et al. |
| 8,887,306 | B1 | 11/2014 | Palacio |
| 9,424,668 | B1 | 8/2016 | Petrou et al. |
| 9,936,066 | B1 | 4/2018 | Mammen et al. |
| 11,019,106 | B1 | 5/2021 | Harvell |
| 11,323,653 | B1 | 5/2022 | Voss |
| 11,509,857 | B2 | 11/2022 | Agrawal et al. |
| 2008/0068343 | A1* | 3/2008 | Hoshino ............ G06F 3/016 345/173 |
| 2008/0155538 | A1 | 6/2008 | Pappas |
| 2008/0194333 | A1* | 8/2008 | Zalewski ........... A63F 13/5375 463/43 |

(Continued)

OTHER PUBLICATIONS

U.S. Appl. No. 17/184,912, "Final Office Action", U.S. Appl. No. 17/184,912, dated Oct. 7, 2022, 24 pages.

(Continued)

*Primary Examiner* — Samira Monshi
(74) *Attorney, Agent, or Firm* — FIG. 1 Patents

(57) ABSTRACT

A media content recording system receives one or more media content streams, such as a video content stream and an audio content stream captured at a computing device. The system also records sensor data collected by one or more sensors of the computing device, such as touch sensors or movement sensors. The system generates a synchronized media content by synchronizing the one or more media content streams with the sensor data. The media content recording system, or a media content playback system, uses the synchronized media content to generate playback content that illustrates inputs to or movement of the computing device while receiving the media content, synchronized with the media content. This playback content is then played back, allowing another user to see, synchronized with the audio or video content, what locations of the computing device the recording user touched or how the recording user moved the computing device.

20 Claims, 10 Drawing Sheets

(56) References Cited

U.S. PATENT DOCUMENTS

| | | |
|---|---|---|
| 2008/0309762 A1* | 12/2008 | Howard ............... G07C 5/0891 348/148 |
| 2009/0317063 A1 | 12/2009 | Adachihara et al. |
| 2013/0016115 A1 | 1/2013 | Minert et al. |
| 2014/0108943 A1 | 4/2014 | Lee et al. |
| 2014/0109063 A1 | 4/2014 | Schissel et al. |
| 2014/0188802 A1 | 7/2014 | Branton et al. |
| 2014/0240440 A1 | 8/2014 | Seo et al. |
| 2014/0250227 A1 | 9/2014 | Slovacek |
| 2014/0359493 A1 | 12/2014 | Hong et al. |
| 2014/0375750 A1 | 12/2014 | Yoshida |
| 2015/0242104 A1 | 8/2015 | Stokman et al. |
| 2015/0281436 A1 | 10/2015 | Kumar et al. |
| 2015/0281445 A1 | 10/2015 | Kumar et al. |
| 2015/0367238 A1 | 12/2015 | Perrin et al. |
| 2015/0378577 A1 | 12/2015 | Lum et al. |
| 2016/0006797 A1 | 1/2016 | Aoki et al. |
| 2016/0072861 A1 | 3/2016 | Woolsey et al. |
| 2016/0205340 A1 | 7/2016 | Jang et al. |
| 2016/0277808 A1 | 9/2016 | Yu et al. |
| 2016/0306514 A1 | 10/2016 | Mckeithan, II |
| 2016/0360256 A1 | 12/2016 | Van Os et al. |
| 2017/0046279 A1 | 2/2017 | Song et al. |
| 2017/0048380 A1 | 2/2017 | Ito et al. |
| 2017/0068829 A1 | 3/2017 | Shaw et al. |
| 2017/0104893 A1 | 4/2017 | Hardy et al. |
| 2017/0164146 A1 | 6/2017 | Coppert |
| 2017/0240440 A1 | 8/2017 | Shao |
| 2017/0243013 A1 | 8/2017 | Herlocher et al. |
| 2017/0269809 A1 | 9/2017 | Qian |
| 2017/0269895 A1 | 9/2017 | Gates et al. |
| 2017/0269976 A1 | 9/2017 | Venkataraman et al. |
| 2017/0289267 A1 | 10/2017 | Eschbach et al. |
| 2018/0046341 A1 | 2/2018 | Lee et al. |
| 2018/0130496 A1 | 5/2018 | Mahapatra et al. |
| 2018/0315428 A1 | 11/2018 | Johnson et al. |
| 2019/0037173 A1 | 1/2019 | Lee et al. |
| 2019/0073490 A1 | 3/2019 | Agrawal et al. |
| 2019/0306310 A1 | 10/2019 | Saito et al. |
| 2019/0369952 A1 | 12/2019 | Little |
| 2020/0050983 A1 | 2/2020 | Balasuramanian et al. |
| 2020/0143821 A1 | 5/2020 | Johnson, Jr. et al. |
| 2020/0219023 A1 | 7/2020 | Duchastel |
| 2021/0012026 A1 | 1/2021 | Taylor et al. |
| 2021/0012036 A1 | 1/2021 | Franzo |
| 2021/0064880 A1 | 3/2021 | Zhang et al. |
| 2021/0069550 A1 | 3/2021 | Clark et al. |
| 2021/0133334 A1 | 5/2021 | Ji et al. |
| 2021/0133459 A1 | 5/2021 | Wang et al. |
| 2021/0192223 A1 | 6/2021 | Williams et al. |
| 2021/0200501 A1 | 7/2021 | Stankoulov |
| 2021/0243233 A1 | 8/2021 | Singh et al. |
| 2021/0243418 A1* | 8/2021 | Ojala .................. H04N 13/366 |
| 2021/0263968 A1 | 8/2021 | Zade et al. |
| 2021/0353209 A1 | 11/2021 | Gossens et al. |
| 2022/0138345 A1 | 5/2022 | Krishnan et al. |
| 2022/0161145 A1 | 5/2022 | Hardee et al. |
| 2022/0206645 A1 | 6/2022 | Zadina et al. |
| 2022/0207175 A1 | 6/2022 | Agrawal et al. |
| 2022/0210365 A1 | 6/2022 | Agrawal et al. |
| 2022/0256111 A1 | 8/2022 | Agrawal et al. |
| 2023/0069486 A1 | 3/2023 | Agrawal et al. |
| 2023/0239426 A1 | 7/2023 | Agrawal et al. |
| 2023/0239427 A1 | 7/2023 | Agrawal et al. |

OTHER PUBLICATIONS

U.S. Appl. No. 17/154,628, "Non-Final Office Action", U.S. Appl. No. 17/154,628, dated Aug. 5, 2022, 19 pages.

U.S. Appl. No. 17/154,677, "Non-Final Office Action", U.S. Appl. No. 17/154,677, dated Jul. 19, 2022, 11 pages.

U.S. Appl. No. 17/154,677, "Notice of Allowance", U.S. Appl. No. 17/154,677, dated Oct. 5, 2022, 5 pages.

U.S. Appl. No. 17/154,628, "Final Office Action", U.S. Appl. No. 17/154,628, dated Jan. 26, 2023, 22 pages.

U.S. Appl. No. 17/985,549, "Non-Final Office Action", U.S. Appl. No. 17/985,549, dated Apr. 18, 2023, 11 pages.

U.S. Appl. No. 17/985,549, "Restriction Requirement", U.S. Appl. No. 17/985,549, dated Mar. 10, 2023, 6 pages.

U.S. Appl. No. 17/184,912, "Non-Final Office Action", U.S. Appl. No. 17/184,912, dated May 25, 2023, 19 pages.

U.S. Appl. No. 18/190,227, "Non-Final Office Action", U.S. Appl. No. 18/190,227, dated Jul. 17, 2023, 12 pages.

U.S. Appl. No. 18/190,263, "Non-Final Office Action", U.S. Appl. No. 18/190,263, dated Jul. 17, 2023, 12 pages.

U.S. Appl. No. 17/154,628, "Corrected Notice of Allowability", U.S. Appl. No. 17/154,628, dated Nov. 3, 2023, 3 pages.

U.S. Appl. No. 17/154,628, "Notice of Allowance", U.S. Appl. No. 17/154,628, dated Oct. 4, 2023, 8 pages.

U.S. Appl. No. 17/985,549, "Final Office Action", U.S. Appl. No. 17/985,549, dated Sep. 6, 2023, 12 pages.

"Non-Final Office Action", U.S. Appl. No. 17/184,912, dated Jan. 5, 2022, 14 pages.

U.S. Appl. No. 17/154,628, "Corrected Notice of Allowability", U.S. Appl. No. 17/154,628, dated Dec. 12, 2023, 2 pages.

U.S. Appl. No. 18/190,227, "Final Office Action", U.S. Appl. No. 18/190,227, dated Dec. 28, 2023, 14 pages.

U.S. Appl. No. 18/190,263, "Notice of Allowance", U.S. Appl. No. 18/190,263, dated Jan. 5, 2024, 5 pages.

* cited by examiner

MEDIA CONTENT RECORDING WITH SENSOR DATA

BACKGROUND

As technology has advanced computing devices have become increasingly commonplace in our lives. For example, many people have one or more of a laptop computer, desktop computer, tablet computer, mobile phone, and so forth. Furthermore, these different devices operate in different manners (e.g., have different operating systems) and can run numerous different types of applications. While this variety of devices and applications provides users with a large number of options, it is not without its problems. One such problem is that it can be difficult for users to learn how to use their devices and applications.

One solution for teaching users how to use their devices and applications is to have a first user that is proficient in using the device or application perform various different tasks using the device or application while a second user records video of the first user. While this is helpful in teaching other users because those other users can see on the video what operations the first user performed, such recordings not without their problems. One such problem is such recordings oftentimes do not adequately capture particular movements of the device or particular buttons of the device that the user pressed during the performance of the various tasks. Accordingly, other users do not have full knowledge of the different actions the proficient user took in performing the one or more tasks, making it difficult for the users to duplicate the actions taken by the proficient user. This can make it difficult for other users to learn how to use their devices or programs, leading to user frustration with their devices and applications.

BRIEF DESCRIPTION OF THE DRAWINGS

Embodiments of media content recording with sensor data are described with reference to the following drawings. The same numbers are used throughout the drawings to reference like features and components.

DETAILED DESCRIPTION

Figure 1:
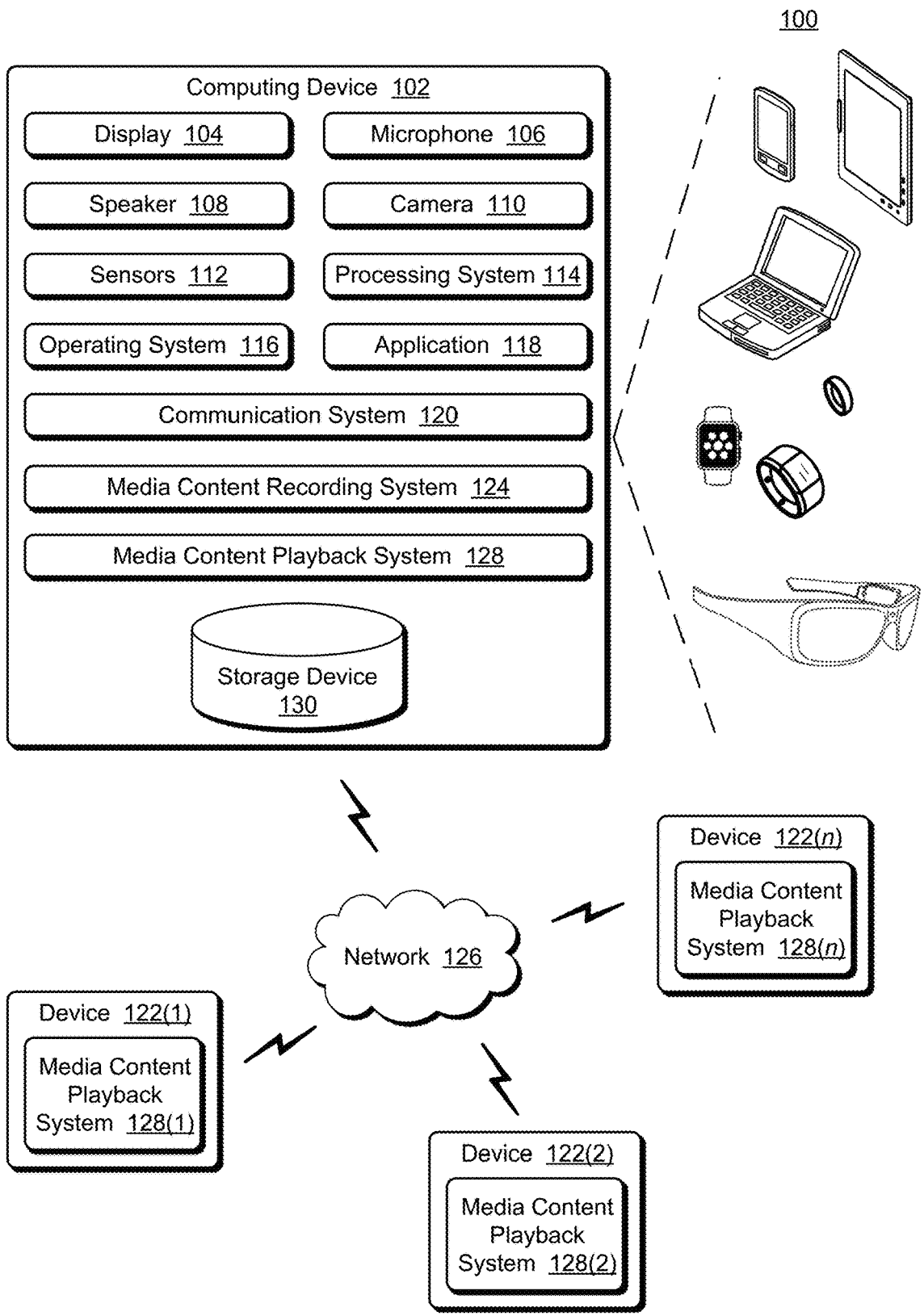
FIG. 1 illustrates an example system including a computing device implementing the techniques discussed herein.

Media content recording with sensor data is discussed herein. Generally, when screen recording is being performed at a computing device, a media content recording system receives one or more media content streams, such as a video content stream captured at the computing device and an audio content stream captured at the computing device. The video content stream includes, for example, the video content that is displayed on the display screen of the computing device or the video content captured by one or more cameras of the computing device. The audio content stream includes, for example, the audio content that is played back by the computing device or the audio content captured by one or more microphones of the computing device (which can thus also include the audio content that is played back by the computing device). The one or more media content streams are streams captured by the computing device while a user (also referred to herein as a recording user) is performing various tasks on the computing device.

Additionally, the media content recording system records sensor data collected by one or more sensors of the computing device, such as touch sensors or movement sensors. For example, the sensors can include accelerometer sensors, gyrometer sensors, pressure sensors, physical key activation sensors, and so forth. The media content recording system generates a synchronized media content by synchronizing the one or more media content streams with the sensor data. The media content recording system uses the synchronized media content to generate playback content that illustrates inputs to or movement of the computing device while receiving the media content, synchronized with the media content. This playback content can then be played back, allowing another user to see, synchronized with the audio or video content, what locations of the computing device the recording user touched or how the recording user moved the computing device.

In contrast to techniques in which a first user performs various tasks using the computing device and a second user records video of the first user performing those tasks, the techniques discussed herein do not require a separate video recording device or a second user recording video. Additionally, the techniques discussed herein provide information that is not included in a typically recorded video. For example, the amount of pressure used in touching a location of the computing device may not be adequately conveyed in a typically recorded video, whereas using the techniques discussed herein the amount of pressure can be readily conveyed using the playback content.

One potential solution to having a separate recording device record the first user performing various tasks using the computing device is for the first user to use his computing device to record the screen of his device. However, such screen recordings are just recordings of the video displayed on the screen of the computing device, and optionally audio that the user provided while performing the various tasks. In contrast to screen recording techniques that record only the video content and the audio content, the techniques discussed herein collect sensor data corresponding to the video content and the audio content. This sensor data indicates, for example, locations touched by the user at particular times, pressure applied at those locations at particular times, movements made by the user at particular times, and so forth. The playback content illustrates these different locations, pressures, and movements, such as by illustrating a computing device being held by two hands and showing the hands or particular fingers touching particular locations of the computing device, moving the computing device in any of the x, y, or z dimensions, and so forth. Thus, another user watching the playback content can readily see exactly what actions the recording user took with the computing device rather than just viewing the recording user's screen or listening to the recording user's audio.

The techniques discussed herein improve the operation of a computing device by generating a more accurate recording of the actions taken by a user when performing various tasks on the computing device. For example, locations of the user's hand or hands, movements of the computing device, amounts of pressure applied, and so forth are readily conveyed in the playback content.

FIG. 1 illustrates an example system 100 including a computing device 102 implementing the techniques discussed herein. The computing device 102 can be, or include, many different types of computing or electronic devices. For example, the computing device 102 can be a smartphone or other wireless phone, a notebook computer (e.g., netbook or ultrabook), a laptop computer, a camera (e.g., compact or single-lens reflex), a wearable device (e.g., a smartwatch, a ring or other jewelry, augmented reality headsets or glasses, virtual reality headsets or glasses), a tablet or phablet computer, a personal media player, a personal navigating device (e.g., global positioning system), an entertainment device (e.g., a gaming console, a portable gaming device, a streaming media player, a digital video recorder, a music or other audio playback device), a video camera, an Internet of Things (IoT) device, a fitness tracker, a smart TV, an automotive computer, and so forth.

The computing device 102 includes a display 104, a microphone 106, a speaker 108, a camera 110, and one or more sensors 112. The display 104 can be configured as any suitable type of display, such as an organic light-emitting diode (OLED) display, active matrix OLED display, liquid crystal display (LCD), in-plane shifting LCD, projector, and so forth. The microphone 106 can be configured as any suitable type of microphone incorporating a transducer that converts sound into an electrical signal, such as a dynamic microphone, a condenser microphone, a piezoelectric microphone, and so forth. The speaker 108 can be configured as any suitable type of speaker incorporating a transducer that converts an electrical signal into sound, such as a dynamic loudspeaker using a diaphragm, a piezoelectric speaker, non-diaphragm based speakers, and so forth.

The camera 110 captures images digitally using any of a variety of different technologies, such as a charge-coupled device (CCD) sensor, a complementary metal-oxide-semiconductor (CMOS) sensor, combinations thereof, and so forth. The camera 110 can include a single sensor and lens, or alternatively multiple sensors or multiple lenses. For example, camera 110 may have at least one lens and sensor positioned to capture images from the front of the computing device 102 (e.g., the same surface as the display is positioned on), and at least one additional lens and sensor positioned to capture images from the back of the computing device 102. These front facing and back facing lenses and sensors can also be referred to as different cameras.

The sensors 112 include one or more sensors that sense user inputs in various manners, such as touch inputs to the computing device 102, movement of the computing device 102, other user movements or motions (whether touching the computing device 102 or not), location or presence of a user, and so forth. Examples of sensors 112 include: touch sensors, such as a touchscreen or touchpad; physical input mechanisms such as buttons, keys, or triggers; touchscreen or display providing raw touch data; accelerometer sensors sensing lateral movements; gyrometer sensors sensing rotational movements; pressure sensors sensing amounts of pressure applied at various locations of the computing device 102; infrared sensors; thermal sensors; radar sensors; and so forth. Although illustrated separately it should be noted that microphone 106 and camera 110 can also be considered to be sensors of the computing device 102.

Although illustrated as part of the computing device 102, it should be noted that one or more of the display 104, the microphone 106, the speaker 108, the camera 110, and the sensors 112 can be implemented separately from the computing device 102. In such situations, the computing device 102 can communicate with the display 104, the microphone 106, the speaker 108, the camera 110, or the sensors 112 via any of a variety of wired (e.g., Universal Serial Bus (USB), IEEE 1394, High-Definition Multimedia Interface (HDMI)) or wireless (e.g., Wi-Fi, Bluetooth, infrared (IR)) connections. For example, the display 104 may be separate from the computing device 102 and the computing device 102 (e.g., a streaming media player) communicates with the display 104 via an HDMI cable. By way of another example, the microphone 106 may be separate from the computing device 102 (e.g., the computing device 102 may be a television and the microphone 106 may be implemented in a remote control device) and voice inputs received by the microphone 106 are communicated to the computing device 102 via an IR or radio frequency wireless connection.

The computing device 102 also includes a processing system 114 that includes one or more processors, each of which can include one or more cores. The processing system 114 is coupled with, and may implement functionalities of, any other components or modules of the computing device 102 that are described herein. In one or more embodiments, the processing system 114 includes a single processor having a single core. Alternatively, the processing system 114 includes a single processor having multiple cores or multiple processors (each having one or more cores).

The computing device 102 also includes an operating system 116. The operating system 116 manages hardware, software, and firmware resources in the computing device 102. The operating system 116 manages one or more applications 118 running on the computing device 102 and operates as an interface between applications 118 and hardware components of the computing device 102.

The computing device 102 also includes a communication system 120. The communication system 120 manages communication with various other devices, such as sending electronic communications to and receiving electronic communications from other devices 122(1), . . . , 122(n), establishing voice calls with other devices 122(1), . . . , 122(n), and so forth. These electronic communications include, for example, playback content or synchronized media content generated by a media content recording system 124 as discussed in more detail below. These other devices 122 can be remote devices or local devices.

The devices 122 can be any of a variety of types of devices, analogous to the discussion above regarding the computing device 102. This communication can take various forms, such as voice calls (e.g., over a cellular system, public switched telephone network (PSTN), network (e.g., using voice over Internet Protocol (VoIP), etc.), short messaging service (SMS) messages, multimedia messaging service (MMS) messages, email, various file transfer techniques (e.g., File Transfer Protocol), group based chat messaging system, and so forth. This communication can be carried out over a network, which can be any of a variety of different networks 126, including the Internet, a local area network (LAN), a public telephone network, a cellular network (e.g., a third generation (3G) network, a fourth generation (4G) network, a fifth generation (5G) network), an intranet, other public or proprietary networks, combinations thereof, and so forth. The computing device 102 can thus communicate with other devices wirelessly and accordingly is also referred to as a wireless device.

The media content recording system 124 receives one or more media content streams, such as a video content stream captured from the operating system 116 and an audio content stream captured from the microphone 106. The media content recording system 124 also records sensor data collected by and received from the sensors 112. The media content recording system 124 generates synchronized media content by synchronizing the one or more media content streams with the sensor data. In one or more implementations, the media content recording system 124 uses the synchronized media content to generate playback content that illustrates inputs to or movement of the computing device 102 while receiving the media content, synchronized with the media content. This playback content can then be played back, allowing another user to see, synchronized with the audio or video content, what locations of the computing device 102 the recording user touched or how the recording user moved the computing device 102.

In one or more implementations, the computing device 102 includes a media content playback system 128, which can play back the playback content. Additionally or alternatively, the playback content is communicated to one or more other devices 122 having a media content playback system 128 that can play back the playback content. Additionally or alternatively, the media content recording system 124 communicates the synchronized media content to the media content playback system 128, and the media content playback system 128 uses the synchronized media content to generate playback content that illustrates inputs to or movement of the computing device 102 while receiving the media content, synchronized with the media content. Additionally or alternatively, the media content recording system 124 communicates the synchronized media content to one or more of the other devices 122, and the corresponding media content playback system 128 at the device 122 uses the synchronized media content to generate playback content that illustrates inputs to or movement of the computing device 102 while receiving the media content, synchronized with the media content.

In one or more implementations, the media content recording system 124 determines to generate the synchronized media content or the playback content in response to a user request to do so (e.g., a request for the computing device 102 to perform screen recording of the display 104). This user request can be input in various manners, such as to the media content recording system 124, an application 118 that invokes the media content recording system 124, a program of the operating system 116 that invokes the media content recording system 124, and so forth. Additionally or alternatively, the media content recording system 124 determines to generate the synchronized media content or the playback content in response to a default configuration setting (e.g., of the operating system 116), a request from another user (e.g., an administrator) or device, and so forth.

The media content recording system 124 and the media content playback system 128 can each be implemented in a variety of different manners. For example, the systems 124 and 128 can be implemented as multiple instructions stored on computer-readable storage media and that can be executed by the processing system 110. Additionally or alternatively, the systems 124 and 128 can be implemented at least in part in hardware (e.g., as an application-specific integrated circuit (ASIC), a field-programmable gate array (FPGA), an application-specific standard product (ASSP), a system-on-a-chip (SoC), a complex programmable logic device (CPLD), and so forth). The systems 124 and 128 can be implemented in the same or different manners.

The computing device 102 also includes a storage device 130. The storage device 130 can be implemented using any of a variety of storage technologies, such as magnetic disk, optical disc, Flash or other solid state memory, and so forth. The storage device 130 can store various program instructions and data for any one or more of the operating system 116, application 118, media content recording system 124, or media content playback system 128.

Figure 2:
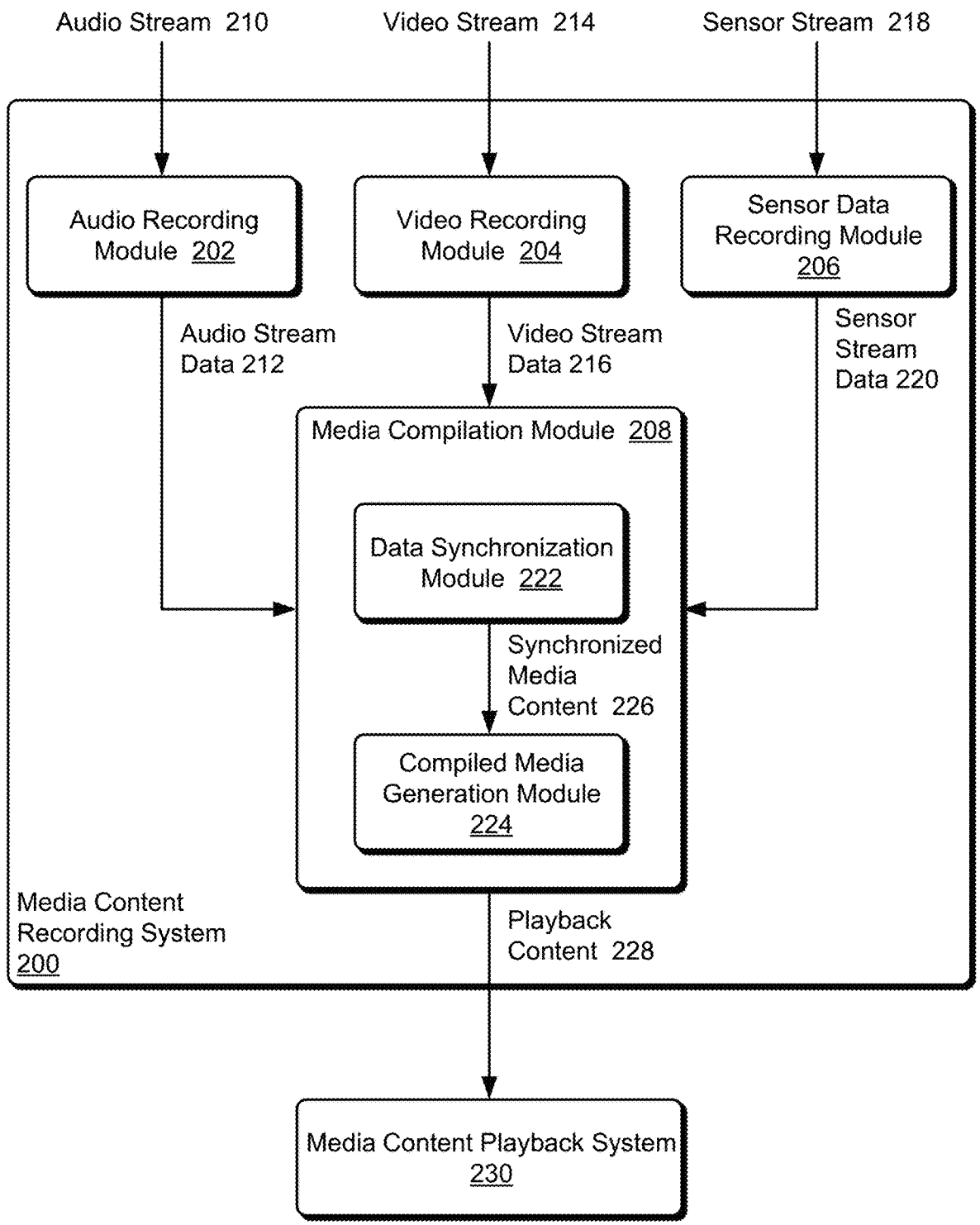
FIG. 2 illustrates an example media content recording system implementing the techniques discussed herein.

FIG. 2 illustrates an example media content recording system 200 implementing the techniques discussed herein. The media content recording system 200 is an example of the media content recording system 124 of FIG. 1.

The media content recording system 200 includes an audio recording module 202, a video recording module 204, a sensor data recording module 206, and a media compilation module 208. The audio recording module 202 receives an audio stream 210 and provides the audio stream 210 to the media compilation module 208 as audio stream data 212. The audio recording module 202 can receive the audio stream 210 in a variety of different manners from various different sources. In one or more implementations, the audio recording module 202 receives the audio stream 210 from the microphone 106, which can include audio from a user of the computing device 102 as well as audio emitted by the speaker 108. In such situations, depending on processing performed by other modules in the computing device 102 or the microphone 106, the audio recording module 202 optionally digitizes the audio stream 210 to generate the audio stream data 212. Additionally or alternatively, the audio recording module 202 receives the audio stream from the program being recorded. For example, if an application 118 (e.g., a video game) is being recorded, the audio recording module 202 can receive the audio data output by the application 118 as the audio stream 210. The audio data output by the application 118 can be received directly from the application 118, from the operating system 116, and so forth.

The video recording module 204 receives a video stream 214 and provides the video stream to the media compilation module 208 as video stream data 216. The video recording module 202 can receive the video stream 214 in a variety of different manners from various different sources. In one or more implementations, the video recording module 204 receives the video stream 214 stream from the program being recorded. For example, if an application 118 (e.g., a video game) is being recorded, the video recording module 204 can receive the video data output by the application 118 as the video stream 214. The video data output by the application 118 can be received directly from the application 118, from the operating system 116, and so forth.

Additionally or alternatively, the video recording module 204 receives the video stream 214 stream from the camera 110. In such situations, depending on processing performed by other modules in the computing device 102 or the camera 110, the video recording module 204 optionally digitizes the video stream 214 to generate the video stream data 216.

The sensor data recording module 206 receives a sensor stream 218 and provides the sensor stream to the media compilation module 208 as sensor stream data 220. The sensor data recording module 206 can receive the sensor stream 218 in a variety of different manners from various different sources. In one or more implementations, the sensor data recording module 206 receives the sensor stream 218 from the individual sensors 112. In such situations, depending on processing performed by other modules in the computing device 102 or the sensors 112, the sensor data recording module 206 optionally digitizes the sensor stream 218 to generate the sensor stream data 220.

Additionally or alternatively, the sensor data recording module 206 receives the sensor stream 218 from the operating system 116 or another module of the computing device 102. For example, a sensor management module or a program of the operating system 116 may collect various sensor data from the sensors 112 and provide the collected sensor data to the sensor data recording module 206 as the sensor stream 218.

The audio stream 210, video stream 214, and sensor stream 218 are captured by the computing device 102 while a user (also referred to herein as a recording user) is performing various tasks on the computing device. The audio stream data 212, video stream data 216, and sensor stream data 220 are optionally provided to the media compilation module 208 as the audio stream 210, video stream 214, and sensor stream 218 are received. Additionally or alternatively, the audio stream data 212, video stream data 216, and sensor stream data 220 are saved by the audio recording module 202, video recording module 204, and sensor data recording module 206, respectively, for later use by the media compilation module 208.

The media compilation module 208 receives the audio stream data 212, the video stream data 216, and the sensor stream data 220. The media compilation module 208 includes a data synchronization module 222 and a compiled media generation module 224. The data synchronization module 222 generates a synchronized media content 226 by synchronizing the audio stream data 212, the video stream data 216, and the sensor stream data 220. Synchronizing the audio stream data 212, the video stream data 216, and the sensor stream data 220 allows the sensor stream data 220 that corresponds to the video stream data 216 (as well as the audio stream data 212) at any given time to be readily determined.

In one or more implementations, the data synchronization module 208 synchronizes the audio stream data 212, the video stream data 216, and the sensor stream data 220 based on timestamps. Each of the audio stream data 212, the video stream data 216, and the sensor stream data 220 includes multiple frames of data. Each frame of data represents the corresponding media content stream or sensor data at a particular time for a particular duration. E.g., the stream data may include 30 frames per second. Each frame in the audio stream data 212, the video stream data 216, and the sensor stream data 220 has a corresponding timestamp indicating the time when the frame was collected or received. The data synchronization module 222 uses these timestamps to determine which frames of sensor stream data 220 correspond to which frames of the audio stream data 212 and which frames of the video stream data 216.

It should be noted that situations can arise in which frames of different types of media content or sensor data are captured at different rates. For example, the video stream 214 may be captured at 30 frames per second, the audio stream 210 may be captured at 60 frames per second, and the sensor stream 218 may be capture at 45 frames per second. In such situations, or situations where the timestamps for frames do not align, any of a variety of public or proprietary techniques can be used to determine which frames of one stream correspond to which frames of another stream.

The data synchronization module 222 outputs, as a result of synchronizing the audio stream data 212, the video stream data 216, and the sensor stream data 220, the synchronized media content 226. The synchronized media content 226 can be configured in any of a variety of different manners. In one or more implementations, the synchronized audio stream data 212 and video stream data 216 are generated in any of a variety of public or proprietary manners, such as an MPEG-4 format. The sensor stream data 220 can be included in the same container as the synchronized audio stream data 212 and video stream data 216 (e.g., the same MPEG-4 file) or a different container (e.g., a separate file).

The compiled media generation module 224 uses the synchronized media content 226 to generate playback content 228. Given that the synchronized media content 226 identifies which audio data frames correspond to which video data frames, the compiled media generation module 224 readily generates playback content 228 that includes the audio stream data and the video stream data synchronized to one another.

The compiled media generation module 224 uses the sensor stream data 220 to alter the display of the video stream data in the playback content 228 to illustrate inputs to the computing device while the video stream data was received. These inputs include any inputs sensed by one of the sensors 112, such as touch inputs to a display screen of the computing device 102, pressing physical buttons or triggers of the computing device 102, changing the orientation of the computing device 102 by rotating the computing device 102 about any of the x, y, or z axes (also referred to as rotational movement), moving the computing device 102 in any of the x, y, or z dimensions (also referred to as lateral movement), and so forth. For each frame of video stream data 216, the compiled media generation module 224 generates a frame of video stream data for the playback content 228 that includes the frame of video stream data 216 modified as appropriate based on the sensor stream data corresponding to the frame of video stream data 216.

In one or more embodiments, for each video frame of the video stream data 216, the compiled media generation module 224 uses the synchronized media content 226 to determine the corresponding sensor stream data 220. This sensor stream data 220 corresponding to the video frame indicates inputs to as well as the position and orientation of the computing device 102 corresponding to the video frame. The position and orientation of the computing device 102 is identified in various manners, such as with reference to a default or origin (e.g., position is relative to the origin (0, 0, 0) in a 3-dimensional coordinate system, orientation is relative to 0 degrees rotation in any of the three dimensions), with reference to the position and orientation corresponding to the previous video frame (e.g., the change in the position and orientation relative to the previous video frame), and so forth.

In one or more embodiments, the compiled media generation module 224 generates the playback content 228 to include a representation of the video stream data 216. Each frame of the video stream data 216 is mapped to a particular position in a frame of the playback content 228 based on the position and orientation of the computing device 102 corresponding to the frame of the video stream data 216. Each frame of the video stream data 216 can be mapped to a particular position in a frame of the playback content 228 to illustrate movement in any of the x, y, or z dimensions as well as rotation of the computing device in any of the x, y, or z dimensions.

In one or more embodiments, the compiled media generation module 224 generates the playback content 228 to include a representation of one or more hands holding a frame of the video stream data 216 or holding a device displaying a frame of the video stream data 216. These representations of hands are images or simulations of hands (e.g., computer-generated) rather than captured images of the actual hands of the recording user. The compiled media generation module 224 generates the representation of the one or more hands in different positions, touching different locations of the computing device 102 or frame of the video stream data 216, and so forth to show how the recording user was holding the computing device 102 at the time the frame of the video stream data 216 was captured, where the recording user was touching the computing device 102 at the time the frame of the video stream data 216 was captured, an amount of pressure applied to the computing device 102 by the recording user at the time the frame of the video stream data 216 was captured, and so forth.

Figure 3:
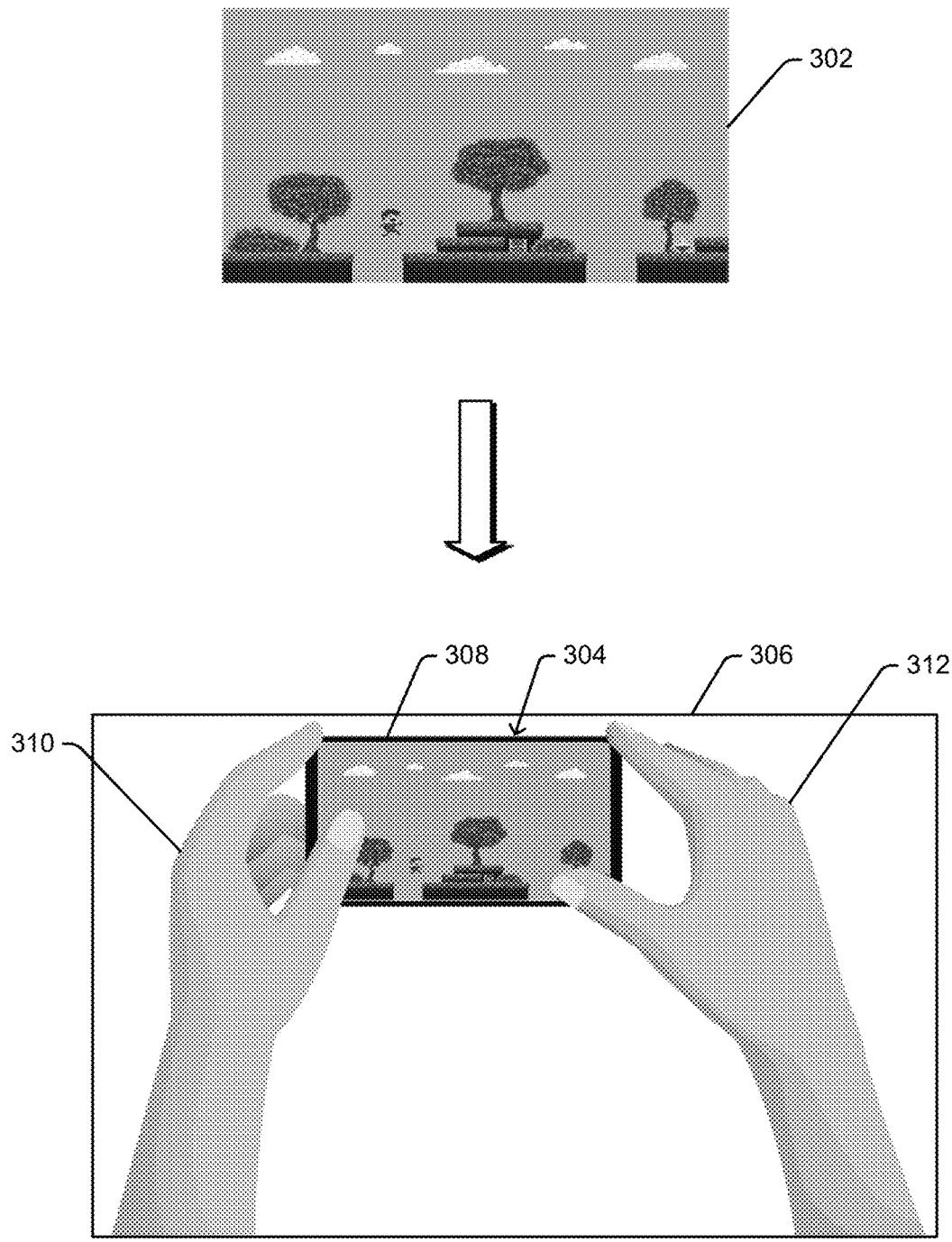
FIGS. 3, 4, 5, and 6 illustrate examples of generating a representation of video stream data in the playback content.

FIG. 3 illustrates an example 300 of generating a representation of the video stream data in the playback content 228. The example 300 illustrates a frame 302 of the video stream data 216, which is mapped to a particular position 304 in a frame 306 of the playback content 228. As illustrated, the example 300 reflects that the position and orientation of the computing device 102 is with the display 104 approximately directly in front of the user and the normal of the display 104 is approximately perpendicular to the face of the user.

The example 300 includes a representation of a computing device 308 as well as hands 310 and 312. The computing device 308 illustrates an example computing device (optionally the same type of computing device as computing device 102) on which video frame is displayed. The hands 310 and 312 illustrate how the recording user was holding the computing device 102 at the time the frame 302 was captured. This allows a viewer of the playback content 228 to readily identify how the recording user was holding the computing device 102, where the recording user's fingers were placed, and so forth.

In one or more embodiments, the hands 310 and 312 are opaque, as illustrated. In such situations the hands 310 and 312 conceal portions of the video frame, but the hands still convey how the recording user was holding the computing device 102, where the recording user's fingers were placed, and so forth.

Additionally or alternatively, the hands 310 and 312 are at least partially transparent. This allows the user to see how the recording user was holding the computing device 102, where the recording user's fingers were placed, and so forth while at the same time allowing the user to at least partially see the content of the frame under the hands 310 and 312. The transparency is optionally a user preference setting, being changeable by, for example, the recording user or a user viewing the playback content 228 (in situations in which the playback content 228 is generated during playback as discussed in more detail below). Different portions of the hands 310 and 312 can have different transparencies. For example, an outline of each hand may have a low transparency (or be opaque) to facilitate viewing of the location of the hand and fingers, but the remainder of the hand may have a higher transparency to facilitate viewing of the frame underneath the hand and fingers.

In one or more embodiments the computing device 308 is not included in the frame 306. In such embodiments, the frame 302 of the video stream data 216 is mapped to a particular position 304 in the frame 306 except that the computing device 308 is not illustrated. This still allows a viewer of the playback content 228 to readily identify how the recording user was holding the computing device 102, where the recording user's fingers were placed, and so forth.

Figure 4:
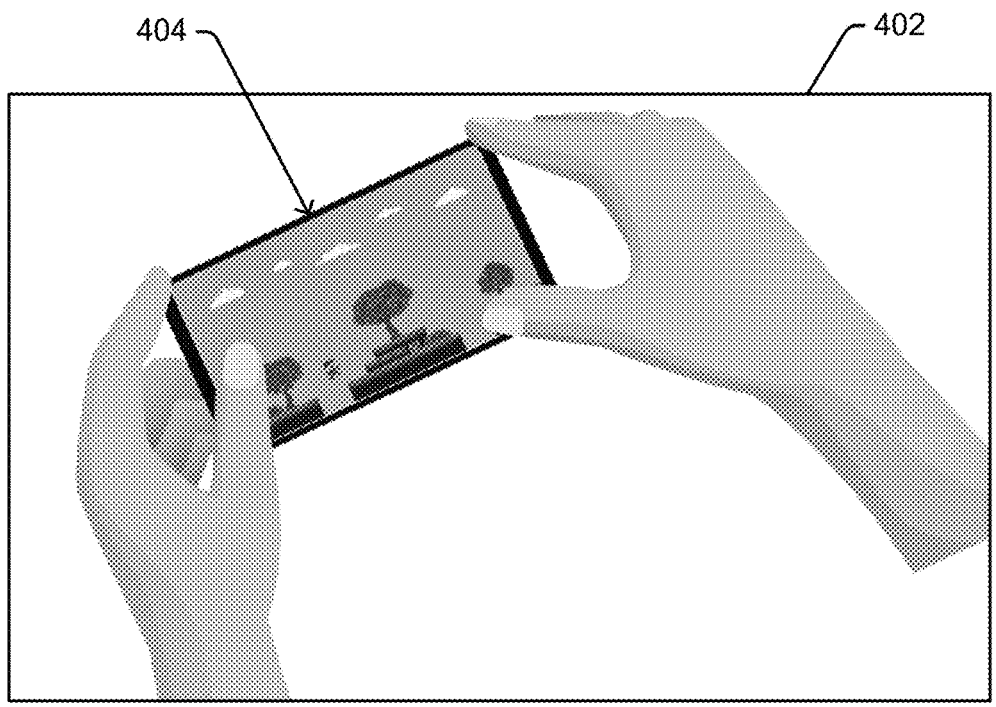
Figure 4:
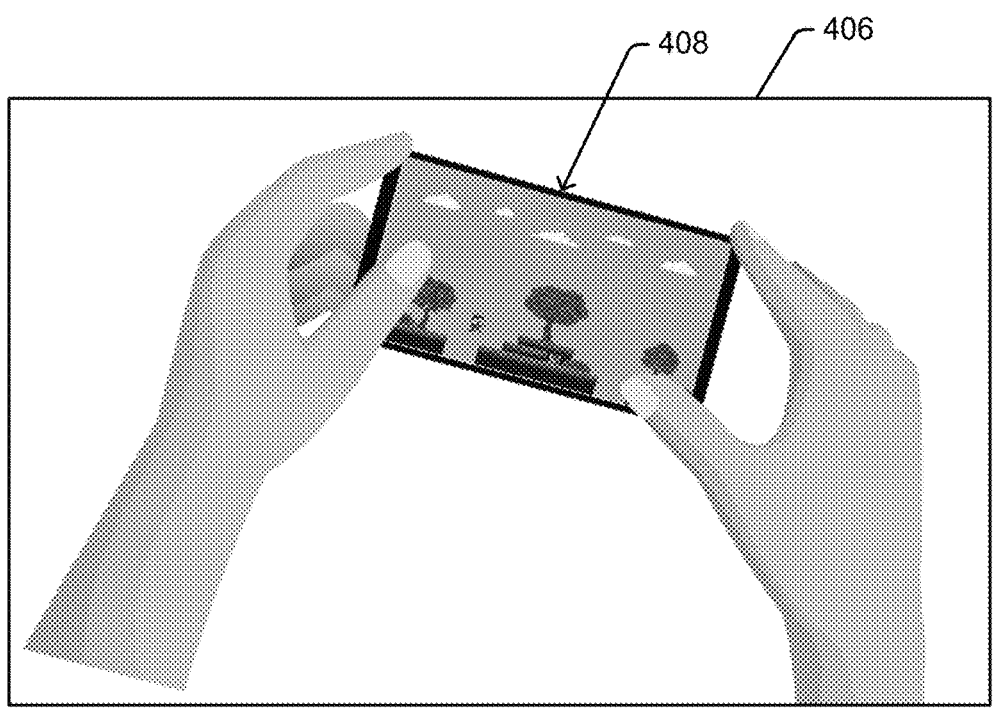

FIG. 4 illustrates additional examples of generating a representation of the video stream data in the playback content 228. An example frame 402 of the playback content 228 illustrates the frame 302 of the video stream data 216 mapped to a particular position 404 in the frame 402. As illustrated, the example frame 402 reflects that the position and orientation of the computing device 102 is with the display 104 approximately directly in front of the user, the normal of the display 104 is approximately perpendicular to the face of the user, and the computing device 102 has been rotated approximately 25 degrees to the left.

An example frame 406 of the playback content 228 illustrates the frame 302 of the video stream data 216 mapped to a particular position 408 in the frame 406. As illustrated, the example frame 406 reflects that the position and orientation of the computing device 102 is with the display 104 approximately directly in front of the user, the normal of the display 104 is approximately perpendicular to the face of the user, and the computing device 102 has been rotated approximately 15 degrees to the right.

The examples of FIGS. 3 and 4 illustrate a representation of a computing device 308. The representation of the computing device 308 can be determined in various manners. In one or more embodiments, the representation of the computing device 308 is a default or generic computing device (e.g., touchscreen device). Additionally or alternatively, the representation of the computing device 308 is a representation of the computing device 102 used by the recording user. The particular computing device 102 can be specified in various manners, such as by the recording user, can be automatically identified by the media content recording system 200 (e.g., by querying the operating system 116), and so forth. In one or more embodiments the media compilation module 208 includes, or has access to, a database or other record of various different computing device representations. Given the particular computing device 102, the media compilation module 208 obtains the appropriate representation of the computing device 102 from this database or other record.

The examples of FIGS. 3 and 4 illustrate a pair of hands. Additionally or alternatively, the compiled media generation module 224 can include other representations in the playback content 228. For example, a representation of a single hand may be included (e.g., in situations in which the recording user is holding the computing device 102 with a single hand), representations of just one or more fingers rather than the entire hand may be included (e.g., representations of just the fingers of the recording user that are touching the computing device 102), and so forth.

Returning to FIG. 1, in one or more embodiments, various touch sensors are included in the computing device 102, such as the display 104 (e.g., a touchscreen) as well as additional touch sensors throughout the computing device 102. Which digits of the user's hands are touching where on the computing device 102 at a given time is determined. This determination can be made by the media content recording system 124 or another module, program, or application of the computing device 102. This determination can be made in various different manners. For example, the fingerprints of the recording user can be known to the computing device 102 and can be captured using various ones of the sensors 112. The fingerprints can be known to the computing device 102 in various manners, such as through an enrollment process where the user provides his or her fingerprints along with an indication or in a manner that associates each fingerprint with a particular one of the user's fingerprints, through a learning process by the manner in which the user touches a touchscreen of the computing device 102 (e.g., the grip of the user), and so forth. By way of another example, the grip of the user may be learned over time (or learned during an enrollment process where the user indicates which finger is which), in which case which digits of the user's hands are touching where on the computing device 102 at a given time is determined by looking at the user's grip rather than recognizing the user's fingerprints.

Which digits of the user's hands are touching where on the computing device 102 at a given time is determined by or provided to the media content recording system 124. The media content recording system 124 uses this information to determine the proper location for fingers and hands when generating the playback content 228. For example, referring again to FIG. 3, using this information the media content recording system 124 readily determines which fingers of hands 310 and 312 are to be illustrated as touching the computing device 308 and where those fingers are to be illustrated as touching the computing device 308.

Returning to FIG. 2, in one or more embodiments the sensor stream data 220 indicates an amount of pressure applied by the recording user when touching the computing device 102. The compiled media generation module 224 uses the pressure information in generating the playback content 228, illustrating in the playback content 228 the amount of pressure applied to a particular location of the computing device 102.

The amount of pressure applied to a particular location of the computing device 102 can be illustrated in a variety of different manners. In one or more implementations, the amount of pressure applied to a particular location of the computing device 102 is illustrated using ripples (e.g., analogous to ripples formed in water after touching or dropping an object into the water) with an initial geometric shape (e.g., a circle) illustrating the location of the computing device that was touched by the recording user and the amount of pressure being indicated using additional concentric geometric shapes. The higher the number of additional concentric geometric shapes, the greater the pressure applied to the location.

Additionally or alternatively, the amount of pressure applied to a particular location of the computing device 102 can be illustrated in other manners, such as circles or other geometric shapes of different colors corresponding to different amounts of pressure (e.g., green indicating a small amount of pressure, yellow indicating a medium amount of pressure, and red indicating a heavy amount of pressure). Additionally or alternatively, the amount of pressure applied to a particular location of the computing device 102 can be illustrated using circles or other geometric shapes of different brightness or intensity levels. E.g., a low brightness or intensity indicating a small amount of pressure, a medium brightness or intensity indicating a medium amount of pressure, and a high brightness or intensity indicating a large amount of pressure).

Figure 5:
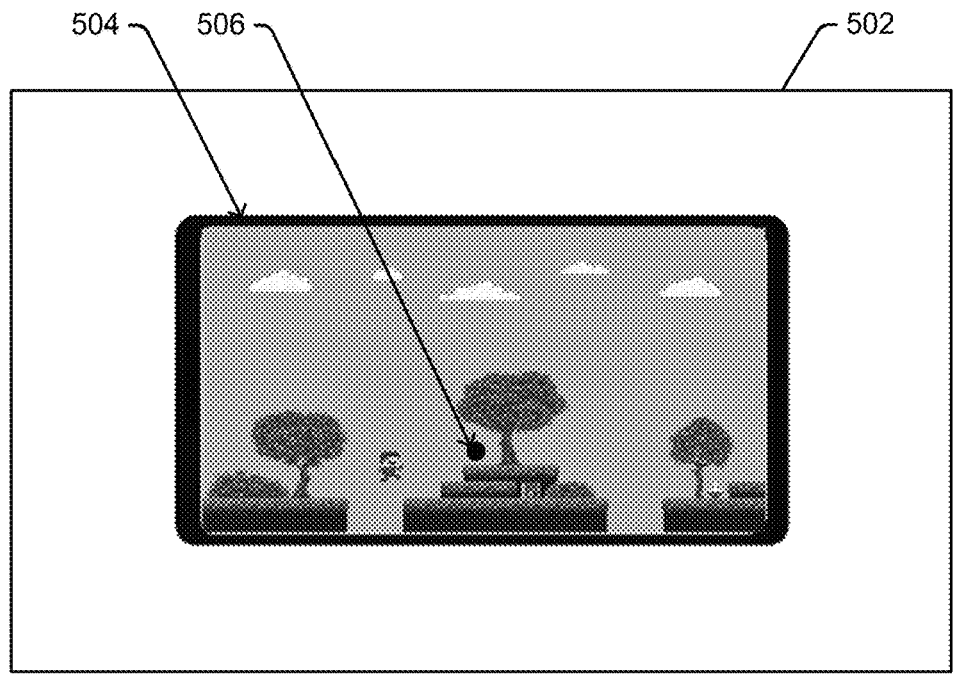
Figure 5:
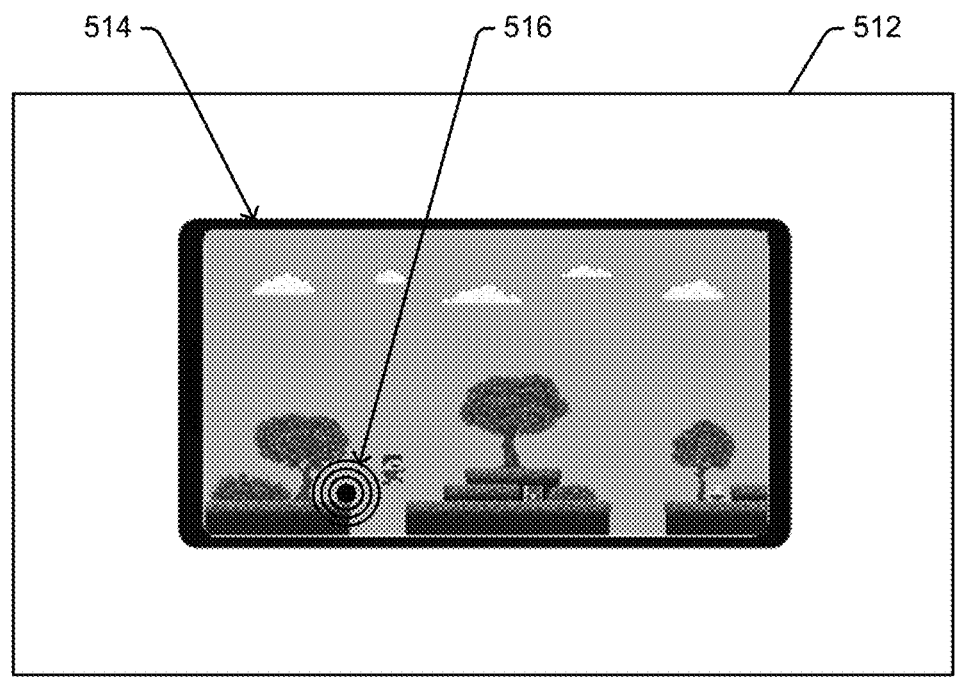

FIG. 5 illustrates additional examples of generating a representation of the video stream data in the playback content 228. An example frame 502 of the playback content 228 illustrates the frame 302 of the video stream data 216 mapped to a particular position 504 in the frame 502. A pressure indicator 506 made up of a filled circle indicates a light amount of pressure applied at the location of the circle. An example frame 512 of the playback content 228 illustrates the frame 302 of the video stream data 216 mapped to a particular position 514 in the frame 512. A pressure indicator 516 made up of a filled circle surrounded by multiple concentric circles indicates a heavy amount of pressure applied at the location of the circle.

Returning to FIG. 2, it should be noted that the compiled media generation module 224 can generate playback content 228 illustrating locations of the computing device 102 touched by the recording user other than on a touchscreen display. For example, the computing device 102 may include one or more physical keys, button, triggers, switches, and so forth that can be touched or otherwise activated by the recording user. The compiled media generation module 224 generates playback content 228 that illustrates which of those physical keys, button, triggers, switches, and so forth are activated by the recording user. Furthermore, if the sensor stream data 220 indicates an amount of pressure applied to the physical keys, button, triggers, switches, and so forth, compiled media generation module 224 can generate playback content 228 that illustrates the amount of pressure applied to those physical keys, button, triggers, switches, and so forth. Which of the physical keys, button, triggers, switches, and so forth, and optionally the amount of pressure applied to those physical keys, button, triggers, switches, and so forth, can be illustrated in any of a variety of different manners as discussed above.

Figure 6:
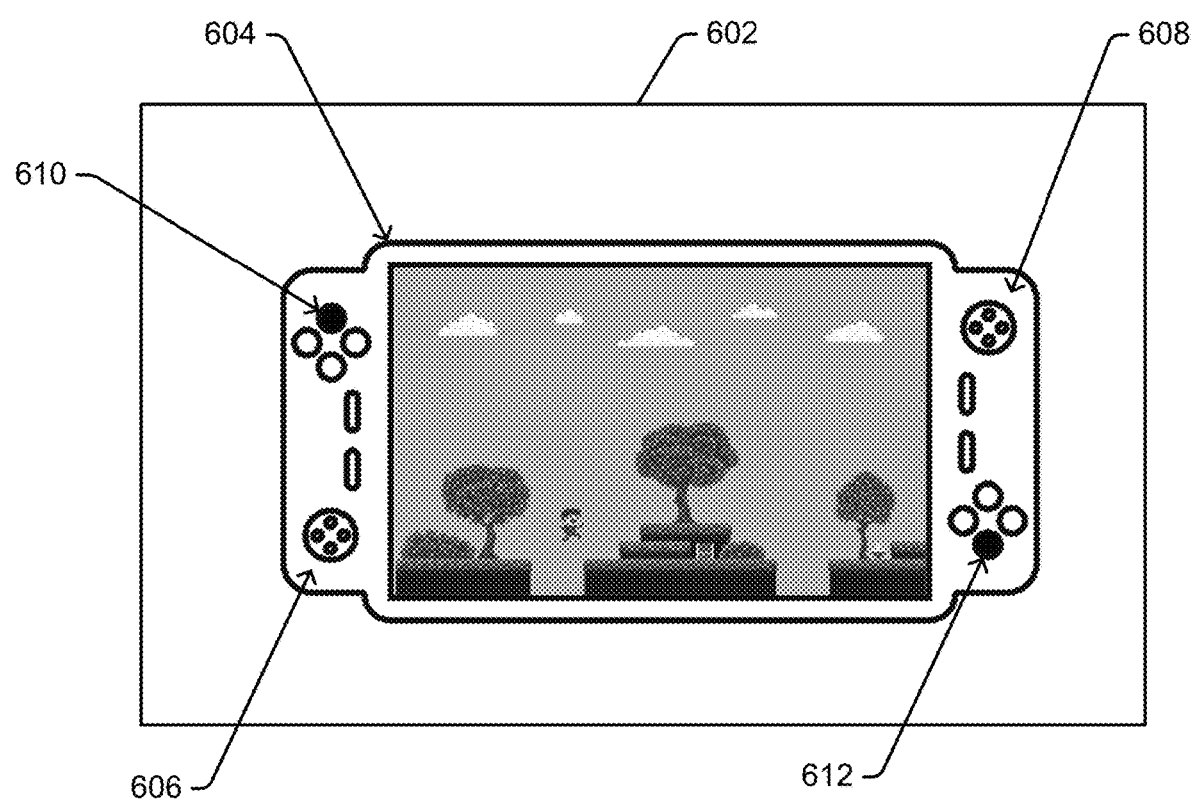

FIG. 6 illustrates an additional example of generating a representation of the video stream data in the playback content 228. An example frame 602 of the playback content 228 illustrates the frame 302 of the video stream data 216 mapped to a particular position 604 in the frame 602. The computing device illustrated in the example frame 602 includes a display screen that is the particular position 604 that the video stream data 216 is mapped to, and multiple physical buttons 606 and 608 on either side of the display screen. Touch indicators 610 and 612, each being a black circle, indicate the physical buttons that were activated by the recording user.

Returning to FIG. 2, the compiled media generation module 224 is discussed with reference to generating compiled media generation module 224 that illustrates inputs to or movement of the computing device while receiving the audio stream data 212 or video stream data 216. Additionally or alternatively, the compiled media generation module 224 generates playback content 228 that illustrates other inputs to the computing device while receiving the audio stream 212 data or video stream data 216. The compiled media generation module 224 can generate playback content 228 illustrating any other user inputs to the computing device 102 that are indicated by the sensor stream data 220.

For example, user gestures or motions made near the computing device 102 but not touching the computing device 102 can be indicated in sensor stream data 220. Such gestures can be detected in various manners, such as using IR sensors, using the camera 110, and so forth. The compiled media generation module 224 illustrates such gestures in the playback content 228 in any of a variety of different manners, such as by illustrating hands or fingers making the same gestures or motions as indicated by the sensor stream data 220.

In the illustrated example of FIG. 2, the media compilation module 208 receives the audio stream data 212, the video stream data 216, and the sensor stream data 220. Additionally or alternatively, the media compilation module 208 receives the audio stream data 212 but not the video stream data 216 (in which case the synchronized media content 226 and the playback content 228 do not include any video data captured by the computing device 102), or receives the video stream data 214 but not the audio stream data 212 (in which case the synchronized media content 226 and the playback content 228 do not include any audio data captured by the computing device 102).

Furthermore, although audio stream 210 and video stream 214 are illustrated in the example of FIG. 2, additionally or alternatively any of various other data streams are provided to the media compilation module 208.

The playback content 228 is provided to the media content playback system 230, which plays back the playback content 228. The media content playback system 230 is an example of the media content playback system 128 of FIG. 1. The media content playback system 230 can be implemented on the same computing device as the media content recording system 200, or on a different computing device. In one or more implementations, the playback content 228 is generated in any of a variety of public or proprietary manners, such as an MPEG-4 format. The playback content 228 can be provided to the media content playback system 230 in various manners, such as a file that is communicated to the media content playback system 230, content that is streamed to the media content playback system 230, and so forth.

It should be noted that the media compilation module 208 optionally generates an additional "normal" playback content that is generated by the compiled media generation module 224 including the audio stream data 212 and the video stream data 216 in the additional playback content but making no changes based on the sensor stream data 220 (e.g., the compiled media generation module 224 ignores the sensor stream data 220). Accordingly, the playback content 228 as well as the additional "normal" playback content can be made available to users, allowing the users to select whether to view the "normal" playback content or the playback content 228.

In one or more embodiments, the compiled media generation module 224 generates the playback content 228 in a known format (e.g., MPEG-4 format) so that the playback content 228 can be played back on any of a variety of media content playback systems 230. The media content playback system 230 need not be aware of how the representations of the video stream data 216 were created.

Figure 7:
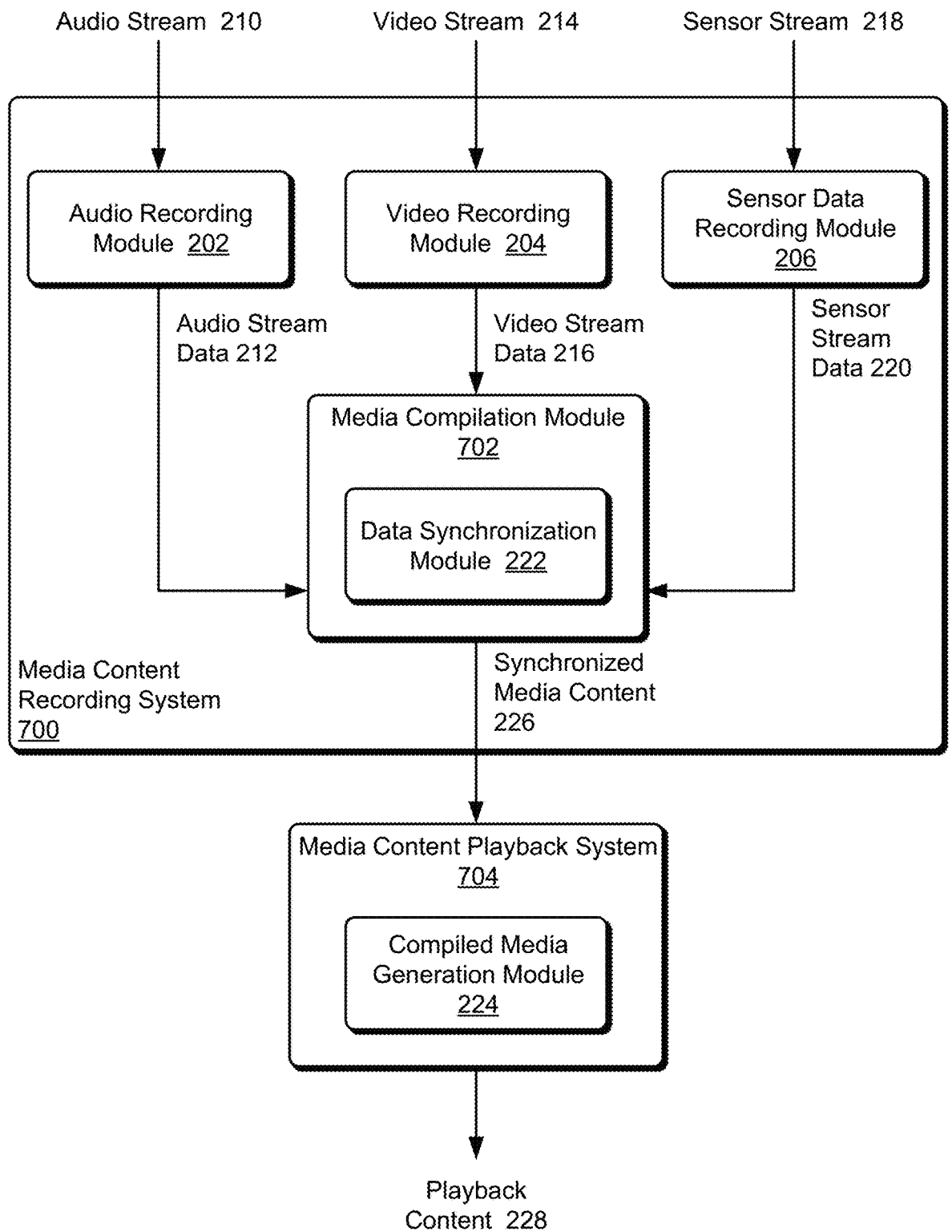
FIG. 7 illustrates another example media content recording system implementing the techniques discussed herein.

FIG. 7 illustrates another example media content recording system 700 implementing the techniques discussed herein. The media content recording system 700 is an example of the media content recording system 124 of FIG. 1. The media content recording system 700 is similar to the media content recording system 200 of FIG. 2 but differs in that the playback content is generated by the media content playback system rather than by the media compilation module.

The media content recording system 700 includes the audio recording module 202, the video recording module 204, and the sensor data recording module 206 as discussed above. The media compilation module 702 includes the data synchronization module 222, which generates synchronized media content 226 as discussed above. The media compilation module 702, unlike the media content recording system 200 of FIG. 2, need not include the compiled media generation module 224.

The synchronized media content 226 is provided to the media content playback system 704, which includes the compiled media generation module 224. The media content playback system 704 is an example of the media content playback system 128 of FIG. 1. The compiled media generation module 224 generates the playback content 228 as discussed above. The playback content 228 can be played back by the media content playback system 704 or provided to another playback system or device for playback.

In one or more embodiments, the media content playback system 704 is implemented on a computing device other than the computing device used by the recording user. A user requesting playback of the playback content 228 is able to input various user preferences indicating how the compiled media generation module 224 generates the playback content 228. Examples of user preferences that can be set include: whether the playback content 228 is to include hands or not, the transparency of hands in the playback content 228, how different amounts of pressure are to be illustrated (e.g., different numbers of concentric circles, different colors), and so forth.

Additionally or alternatively, in one or more embodiments the media content playback system 704 supports multiple modes, such as a normal mode and a simulated mode. In the normal mode the compiled media generation module 224 generates the playback content 228 including the audio stream data 212 and the video stream data 216 but makes no changes based on the sensor stream data 220 (e.g., the compiled media generation module 224 ignores the sensor stream data 220). In the simulated mode, the compiled media generation module 224 generates the playback content 228 based on the audio stream data 212, the video stream data 216, and the sensor stream data 220 as discussed above. Which mode the media content playback system 704 operates in is optionally a user selectable preference.

Figure 8:
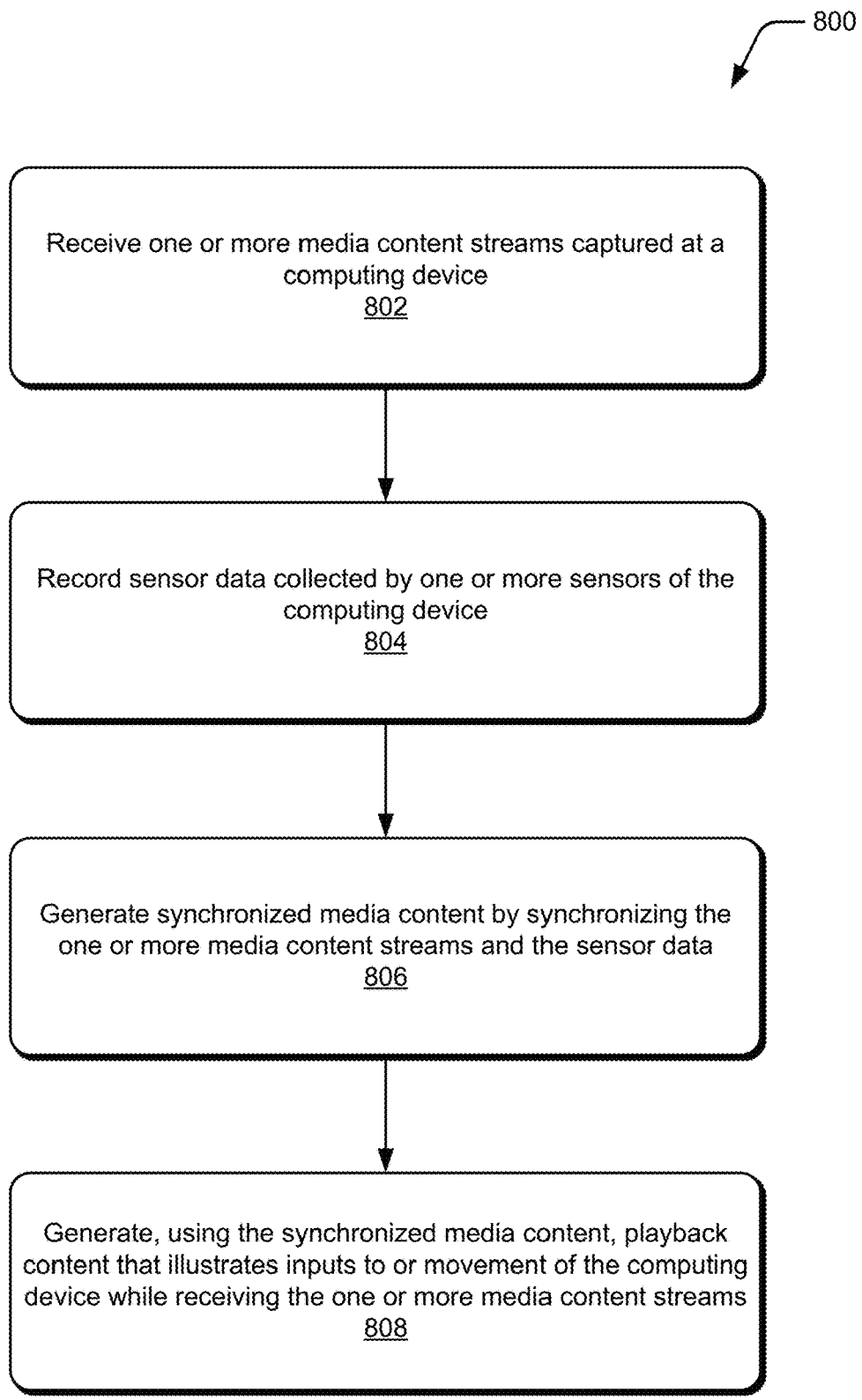
FIG. 8 illustrates an example process for implementing the techniques discussed herein in accordance with one or more embodiments.

FIG. 8 illustrates an example process 800 for implementing the techniques discussed herein in accordance with one or more embodiments. Process 800 is carried out by a media content recording system, such as media content recording system 200 of FIG. 2, and can be implemented in software, firmware, hardware, or combinations thereof. Process 800 is shown as a set of acts and is not limited to the order shown for performing the operations of the various acts.

In process 800, one or more media content streams are captured at a computing device (act 802). The one or more media content streams include, for example, a video content stream and an audio content stream.

Sensor data collected by one or more sensors of the computing device is recorded (act 804). The one or more sensors include, for example, touch sensors or movement sensors. The one or more sensors sense various inputs to or movements of the computing device while the one or more media content streams are being captured.

A synchronized media content is generated by synchronizing the one or more media content streams and the sensor data (act 806). Synchronizing the one or more media content streams and the sensor data allows the sensor data that corresponds to the one or more content streams at any given time to be readily determined.

Using the synchronized media content, playback content is generated (act 808). The playback content includes the one or more content streams and illustrates inputs to or movement of the computing device while receiving the one or more media content streams. These inputs to or movement of the computing device are synchronized to the one or more media content streams.

The process 800 can be performed at various times, such as in response to a determination being made (e.g., by the media content recording system) that recording of the one or more content streams (e.g., display screen recording) is activated.

Figure 9:
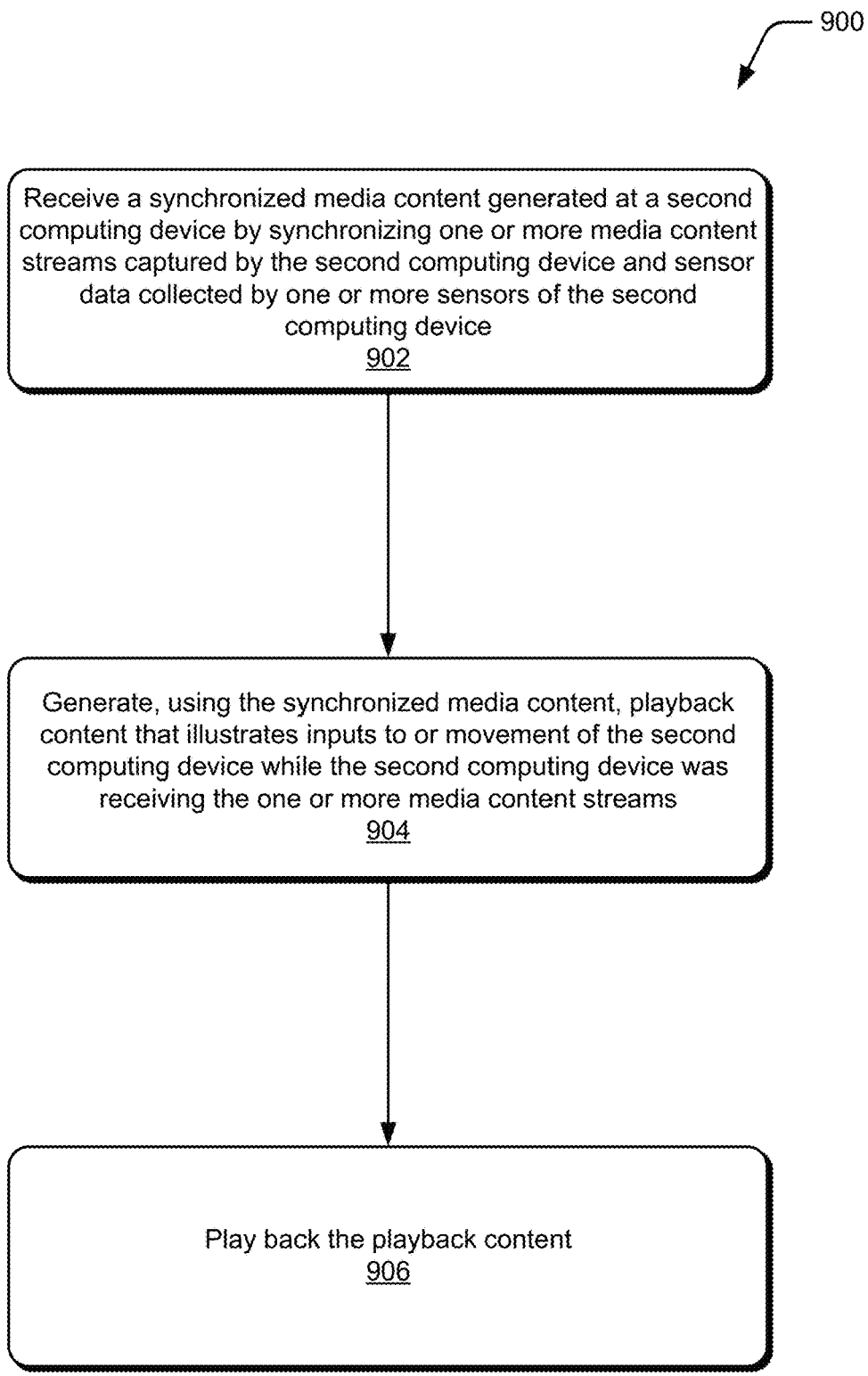
FIG. 9 illustrates another example process for implementing the techniques discussed herein in accordance with one or more embodiments.

FIG. 9 illustrates an example process 900 for implementing the techniques discussed herein in accordance with one or more embodiments. Process 900 is carried out by a media content playback system, such as media content playback system 704 of FIG. 7, and can be implemented in software, firmware, hardware, or combinations thereof. Process 900 is shown as a set of acts and is not limited to the order shown for performing the operations of the various acts.

In process 900, synchronized media content is received at a first computing device (act 902). The synchronized media content was generated at a second computing device by synchronizing one or more media content streams captured by the second computing device and sensor data collected by one or more sensors of the second computing device. The one or more sensors include, for example, touch sensors or movement sensors.

Playback content is generated using the synchronized media content (act 904). The playback content illustrates inputs to or movement of the second computing device while the second computing device was receiving the one or more media content streams. These inputs to or movement of the computing device is synchronized to the one or more media content streams.

The playback content is played back at the first computing device (act 906). The playback content allows another user (e.g., a user of the first computing device) to see, synchronized with the audio or video content, what locations of the second computing device the recording user touched or how the recording user moved the second computing device.

The process 900 can be performed at various times, such as in response to a user request, in response to new synchronized media content being available, and so forth.

Figure 10:
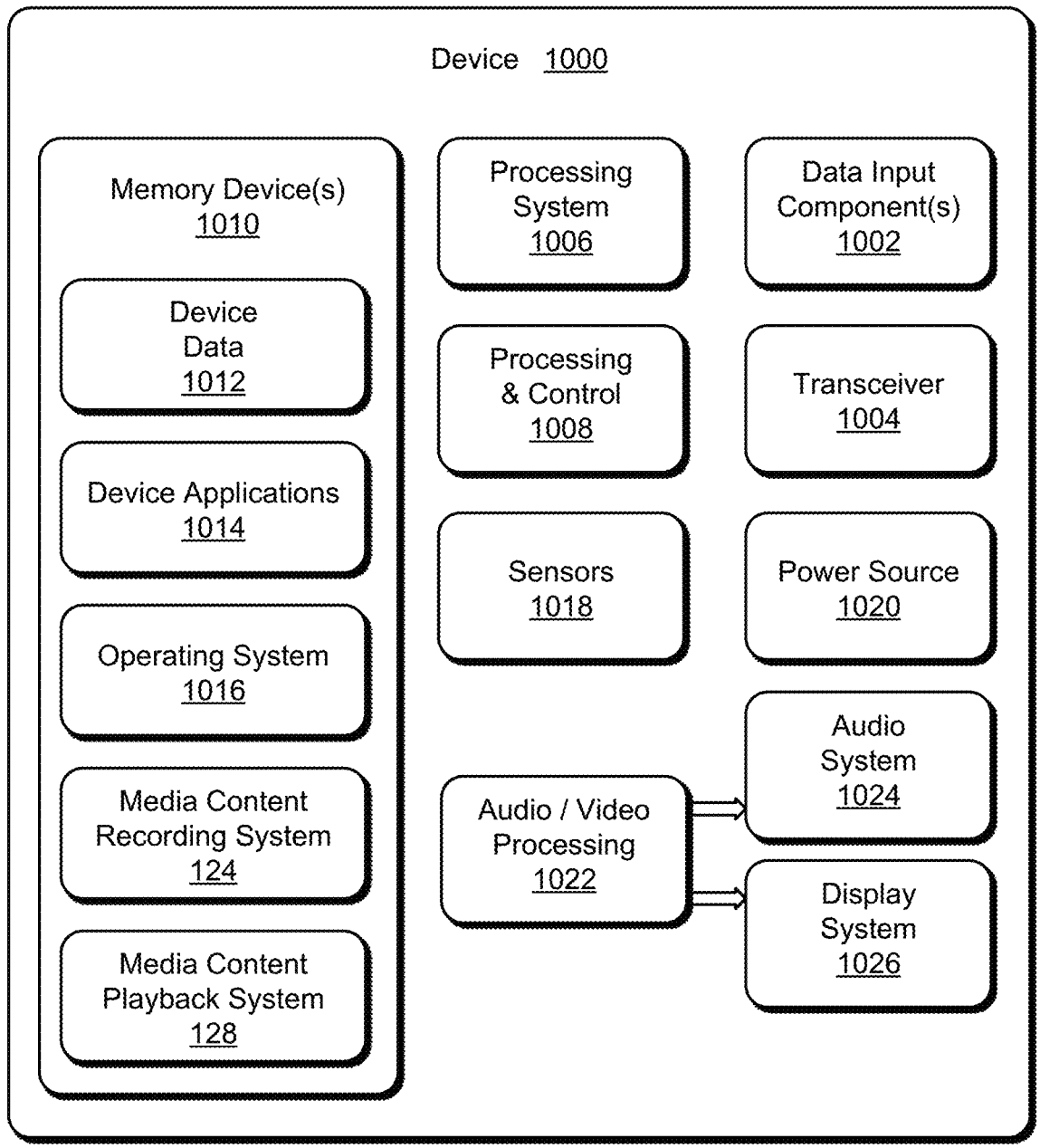
FIG. 10 illustrates various components of an example electronic device that can implement embodiments of the techniques discussed herein.

FIG. 10 illustrates various components of an example electronic device in which embodiments of media content recording with sensor data can be implemented. The electronic device 1000 can be implemented as any of the devices described with reference to the previous FIGS., such as any type of client device, mobile phone, tablet, computing, communication, entertainment, gaming, media playback, or other type of electronic device. In one or more embodiments the electronic device 1000 includes one or both of the media content recording system 124 and the media content playback system 128, described above. Accordingly, in some embodiments the electronic device 1000 does not include the media content recording system 124, and in some embodiments the electronic device 1000 does not include the media content playback system 128.

The electronic device 1000 includes one or more data input components 1002 via which any type of data, media content, or inputs can be received such as user-selectable inputs, messages, music, television content, recorded video content, and any other type of text, audio, video, or image data received from any content or data source. The data input components 1002 may include various data input ports such as universal serial bus ports, coaxial cable ports, and other serial or parallel connectors (including internal connectors) for flash memory, DVDs, compact discs, and the like. These data input ports may be used to couple the electronic device to components, peripherals, or accessories such as keyboards, microphones, or cameras. The data input components 1002 may also include various other input components such as microphones, touch sensors, touchscreens, keyboards, and so forth.

The device 1000 includes communication transceivers 1004 that enable one or both of wired and wireless communication of device data with other devices. The device data can include any type of text, audio, video, image data, or combinations thereof. Example transceivers include wireless personal area network (WPAN) radios compliant with various IEEE 802.15 (Bluetooth™) standards, wireless local area network (WLAN) radios compliant with any of the various IEEE 802.11 (WiFi™) standards, wireless wide area network (WWAN) radios for cellular phone communication, wireless metropolitan area network (WMAN) radios compliant with various IEEE 802.15 (WiMAX™) standards, wired local area network (LAN) Ethernet transceivers for network data communication, and cellular networks (e.g., third generation networks, fourth generation networks such as LTE networks, or fifth generation networks).

The device 1000 includes a processing system 1006 of one or more processors (e.g., any of microprocessors, controllers, and the like) or a processor and memory system implemented as a system-on-chip (SoC) that processes computer-executable instructions. The processing system 1006 may be implemented at least partially in hardware, which can include components of an integrated circuit or on-chip system, an application-specific integrated circuit (ASIC), a field-programmable gate array (FPGA), a complex programmable logic device (CPLD), and other implementations in silicon or other hardware.

Alternately or in addition, the device can be implemented with any one or combination of software, hardware, firmware, or fixed logic circuitry that is implemented in connection with processing and control circuits, which are generally identified at 1008. The device 1000 may further include any type of a system bus or other data and command transfer system that couples the various components within the device. A system bus can include any one or combination of different bus structures and architectures, as well as control and data lines.

The device 1000 also includes computer-readable storage memory devices 1010 that enable data storage, such as data storage devices that can be accessed by a computing device, and that provide persistent storage of data and executable instructions (e.g., software applications, programs, functions, and the like). Examples of the computer-readable storage memory devices 1010 include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage media in various memory device configurations. The device 1000 may also include a mass storage media device.

The computer-readable storage memory device 1010 provides data storage mechanisms to store the device data 1012, other types of information or data, and various device applications 1014 (e.g., software applications). For example, an operating system 1016 can be maintained as software instructions with a memory device and executed by the processing system 1006. The device applications 1014 may also include a device manager, such as any form of a control application, software application, signal-processing and control module, code that is native to a particular device, a hardware abstraction layer for a particular device, and so on.

The device 1000 can also include one or more device sensors 1018, such as any one or more of an ambient light sensor, a proximity sensor, a touch sensor, an infrared (IR) sensor, accelerometer, gyroscope, thermal sensor, audio sensor (e.g., microphone), and the like. The device 1000 can also include one or more power sources 1020, such as when the device 1000 is implemented as a mobile device. The power sources 1020 may include a charging or power system, and can be implemented as a flexible strip battery, a rechargeable battery, a charged super-capacitor, or any other type of active or passive power source.

The device 1000 additionally includes an audio or video processing system 1022 that generates one or both of audio data for an audio system 1024 and display data for a display system 1026. In accordance with some embodiments, the audio/video processing system 1022 is configured to receive call audio data from the transceiver 1004 and communicate the call audio data to the audio system 1024 for playback at the device 1000. The audio system or the display system may include any devices that process, display, or otherwise render audio, video, display, or image data. Display data and audio signals can be communicated to an audio component or to a display component, respectively, via an RF (radio frequency) link, S-video link, HDMI (high-definition multimedia interface), composite video link, component video link, DVI (digital video interface), analog audio connection, or other similar communication link. In implementations, the audio system or the display system are integrated components of the example device. Alternatively, the audio system or the display system are external, peripheral components to the example device.

Although embodiments of techniques for media content recording with sensor data have been described in language specific to features or methods, the subject of the appended claims is not necessarily limited to the specific features or methods described. Rather, the specific features and methods are disclosed as example implementations of techniques for implementing media content recording with sensor data. Further, various different embodiments are described, and it is to be appreciated that each described embodiment can be implemented independently or in connection with one or more other described embodiments. Additional aspects of the techniques, features, and/or methods discussed herein relate to one or more of the following:

A method comprising: receiving one or more media content streams including a video content stream captured at a computing device; recording sensor data collected by one or more sensors of the computing device, the one or more sensors including touch sensors or movement sensors; generating a synchronized media content by synchronizing the one or more media content streams and the sensor data; and generating, using the synchronized media content, playback content that includes the video content stream and illustrates inputs to or movement of the computing device while receiving the one or more media content streams, the inputs to or movement of the computing device being synchronized to the one or more media content streams.

Alternatively or in addition to the above described method, any one or combination of the following. The method further comprising: determining that screen recording is being performed at the computing device; and performing the receiving, recording, generating the synchronized media content, and generating the playback content in response to determining that screen recording is being performed at the computing device. The video content stream comprising video displayed on a display of the computing. The one or more media content streams including an additional video content stream captured by a camera of the computing device. The one or more media content streams including an audio content stream captured by a microphone of the computing device. The one or more media content streams including an audio content stream played back by a speaker of the computing device. The sensor data including data, received from one or more touch sensors of the computing device, indicating the inputs to the computing device while capturing the video content stream. The sensor data further including data, received from one or more accelerometer sensors of the computing device, indicating lateral movements of the computing device while capturing the video content stream. The sensor data further including data, received from one or more gyrometer sensors of the computing device, indicating rotational movements of the computing device while capturing the video content stream. The sensor data including data, received from one or more touch sensors, indicating an amount of pressure applied at various locations of the computing device while capturing the video content stream. The sensor data including indications of physical key activations at the computing device while capturing the video content stream. The generating playback content including generating playback content including representations of hands illustrating how, at each point in time in the one or more media content streams, the computing device was being held by a user. The generating playback content including generating playback content illustrating which directions, synchronized with the one or more media content streams, the computing device was moved. The generating playback content including generating playback content illustrating how, synchronized with the one or more media content streams, the computing device was rotated. The generating playback content including generating playback content illustrating amounts of pressure, synchronized with the one or more media content streams, applied to locations of the computing device. The generating playback content including generating playback content including representations of one or more hands illustrating, synchronized with the one or more media content streams, directions that the one or more hands moved the computing device, how the computing device was being held by a user, and locations of the computing device touched by the user.

A computing device comprising: one or more sensors including touch sensors or movement sensors; one or more recording modules, implemented at least in part in hardware, to receive one or more media content streams including a video content stream captured at the computing device; a sensor data recording module to record sensor data collected by the one or more sensors; a data synchronization module to generate a synchronized media content by synchronizing the one or more media content streams and the sensor data; and a compiled media generation module to generate, using the synchronized media content, playback content that includes the video content stream and illustrates inputs to or movement of the computing device while receiving the one or more media content streams, the inputs to or movement of the computing device being synchronized to the one or more media content streams.

A method comprising: receiving, at a first computing device, a synchronized media content generated at a second computing device by synchronizing one or more media content streams captured by the second computing device and sensor data collected by one or more sensors of the second computing device, the one or more sensors including touch sensors or movement sensors; generating, using the synchronized media content, playback content that illustrates inputs to or movement of the second computing device while the second computing device was receiving the one or more media content streams, the inputs to or movement of the computing device being synchronized to the one or more media content streams; and playing back, at the computing device, the playback content.

Alternatively or in addition to the above described method, any one or combination of the following. The generating playback content including generating playback content illustrating which directions, synchronized with the one or more media content streams, the computing device was moved and illustrating how, synchronized with the one or more media content streams, the computing device was rotated. The generating playback content including generating playback content including representations of one or more hands illustrating, synchronized with the one or more media content streams, directions that the one or more hands moved the second computing device, how the second computing device was being held by a user, and locations of the second computing device touched by the user.

What is claimed is:

1. A method comprising:
receiving one or more media content streams including a video content stream captured at a computing device;
recording sensor data collected by one or more sensors of the computing device, the sensor data indicating locations on a touchscreen of the computing device touched by a user at particular times during the video content stream, the touched locations including fingerprint data indicating different fingers of the user used to provide touch inputs at the locations;
generating a synchronized media content by synchronizing the one or more media content streams and the sensor data; and
generating, using the synchronized media content, playback content that includes the video content stream and representations of one or more hands illustrating, synchronized with the one or more media content streams, the different fingers of the user indicated by the fingerprint data touching the touchscreen of the computing device at the locations.

2. The method of claim 1, the video content stream comprising video displayed on a display of the computing device.

3. The method of claim 1, the one or more media content streams including an additional video content stream captured by a camera of the computing device.

4. The method of claim 1, the one or more media content streams including an audio content stream captured by a microphone of the computing device.

5. The method of claim 1, the one or more media content streams including an audio content stream played back by a speaker of the computing device.

6. The method of claim 1, the sensor data further including data, received from one or more accelerometer sensors of the computing device, indicating lateral movements of the computing device while capturing the video content stream.

7. The method of claim 6, the sensor data further including data, received from one or more gyrometer sensors of the computing device, indicating rotational movements of the computing device while capturing the video content stream.

8. The method of claim 1, the sensor data including data, received from one or more touch sensors of the touchscreen, indicating amounts of pressure applied at the locations on the touchscreen of the computing device while capturing the video content stream.

9. The method of claim 1, the sensor data including indications of physical key activations at the computing device while capturing the video content stream.

10. The method of claim 1, the generating playback content including generating playback content illustrating which directions, synchronized with the one or more media content streams, the computing device was moved.

11. The method of claim 1, the generating playback content including generating playback content illustrating how, synchronized with the one or more media content streams, the computing device was rotated.

12. The method of claim 1, the generating playback content including generating playback content illustrating amounts of pressure, synchronized with the one or more media content streams, applied to the locations where the touchscreen of the computing device was touched.

13. The method of claim 1, the generating playback content including generating playback content including the representations of the one or more hands illustrating, synchronized with the one or more media content streams, directions that the one or more hands moved the computing device, how the computing device was being held by the user, and the locations on the touchscreen of the computing device touched by the different fingers of the user.

14. A computing device comprising:
one or more sensors including touch sensors or movement sensors;
one or more recording modules, implemented at least in part in hardware, to receive one or more media content streams including a video content stream captured at the computing device;
a sensor data recording module to record sensor data collected by the one or more sensors, the sensor data indicating amounts of pressure applied to locations on a touchscreen of the computing device touched by a user during the video content stream;
a data synchronization module to generate a synchronized media content by synchronizing the one or more media content streams and the sensor data; and
a compiled media generation module to generate, using the synchronized media content, playback content that includes the video content stream and illustrates the amounts of pressure, synchronized with the one or more media content streams, applied to the locations of the touchscreen.

15. A method comprising:
receiving, at a first computing device, a synchronized media content generated at a second computing device by synchronizing one or more media content streams captured by the second computing device and sensor data collected by one or more sensors of the second computing device, the sensor data indicating amounts of pressure applied to locations on a touchscreen of the second computing device touched by a user during the one or more media content streams;
generating, using the synchronized media content, playback content that illustrates the amounts of pressure, synchronized with the one or more media content streams, applied to the locations on the touchscreen of the second computing device touched by the user during the one or more media content streams; and
playing back, at the first computing device, the playback content.

16. The method of claim 15, the generating playback content including generating playback content illustrating how, synchronized with the one or more media content streams, the second computing device was rotated.

17. The method of claim 15, the generating playback content including generating playback content including representations of one or more hands illustrating, synchronized with the one or more media content streams, directions that the one or more hands moved the second computing device, how the second computing device was being held by the user, and the amounts of pressure applied to the locations on the touchscreen of the second computing device touched by the user.

18. The method of claim 1, the playback content including indicators illustrating inputs to or movement of the computing device, the indicators illustrated at least partially within the video content stream.

19. The method of claim 1, the sensor data indicating amounts of pressure applied to physical keys of the computing device activated by the user during the video content stream, and the generating playback content including generating playback content illustrating the amounts of pressures, synchronized with the one or more media content streams, applied to the physical keys of the computing device.

20. The method of claim 1, further comprising:
- determining that screen recording is being performed at the computing device; and
- performing the receiving, the recording, the generating the synchronized media content, and the generating the playback content in response to determining that screen recording is being performed at the computing device.

* * * * *